F. X. COTE.
COMB CLEANER.
APPLICATION FILED OCT. 14, 1910.
979,747.
Patented Dec. 27, 1910.
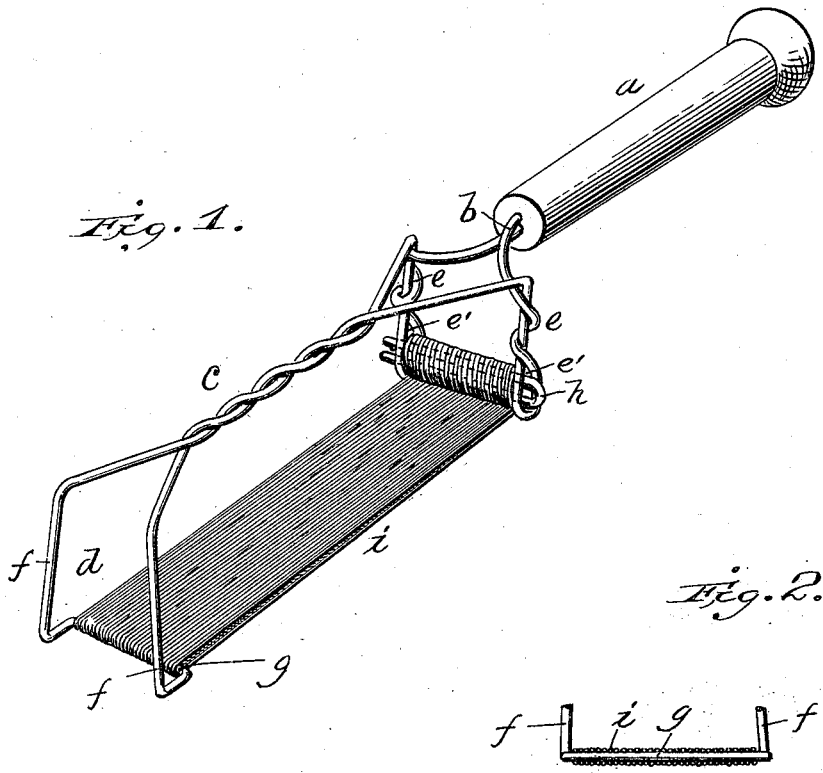

UNITED STATES PATENT OFFICE.

FRANCOIS X. COTE, OF BIDDEFORD, MAINE.

COMB-CLEANER.

979,747.  Specification of Letters Patent.  Patented Dec. 27, 1910.

Application filed October 14, 1910. Serial No. 587,071.

*To all whom it may concern:*

Be it known that I, FRANCOIS X. COTE, a citizen of the United States, and a resident of Biddeford, in the county of York and State of Maine, have invented certain new and useful Improvements in Comb-Cleaners, of which the following is a full and clear specification, reference being had to the accompanying drawings, in which—

Figure 1 is a perspective view of my improved device complete; and Fig. 2 is a side elevation thereof, partly in section.

The object of this invention is to provide a simple tool which by a reciprocating action in engagement with the teeth of the comb will dislodge and brush out all matter that has lodged or caked between the teeth of the comb; and the invention consists of certain novel features of construction hereinafter described and pointed out in the claim.

In the drawing, $a$ designates a handle to which is rigidly attached a frame consisting of a shank portion $b$, a back portion $c$ carrying a loop $d$ at its outer end and a pair of arms $e$ at its inner end where it joins the shank. This entire frame is desirably made out of a single piece of stiff wire bent into shape, the two end portions of the wire being brought together to form a shank and being rigidly fastened in the end of the handle. The twisted wire forming the arms $e$ is bent so as to form a vertically elongated eye $e'$ at the outer end of the arms, these eyes being in alinement with each other. The wire members forming the back $c$ are twisted together to give rigidity.

The loop at the outer end of the frame consists of two depending arms $f$ whose lower ends are bent horizontally toward the handle and are connected together by a cross bar $g$, which bar lies in a horizontal plane coincident with the lower extremities of the eyes in the lower ends of the arms $e$. A flat cross bar $h$ extends between the two arms and has its extremities projecting outwardly through the eyes therein, this bar being preferably formed of a piece of wire bent upon itself and being held vertically edgewise by engagement with the elongated eyes. Connecting the cross bar $h$ with the cross bar $g$ is a webbing $i$ consisting of numerous separate flexible threads or cords, which are drawn taut, these threads being preferably mounted on the cross bars by looping them over the outer bar $g$ and wrapping their free ends around the bar $h$ and then thrusting the bar $h$ into the eyes, this bar being prevented from turning after it is once set into the eyes by its flat construction engaging with the elongated eyes. It will be observed that the two may be tightened when loosened by use by simply removing the cross bar $h$ from its eyes and rotating it a half turn and then re-inserting it into the eyes. The wire frame is sufficiently flexible to yield and to keep the threads taut. It will be observed also that the threads are not only sufficiently flexible to adjust themselves laterally to the size of the spaces between the teeth of the comb but that also their looped portions are free to slide laterally on the cross bar $g$, so that this device is adapted for cleaning combs having various sizes of teeth. It is desirable that the threads shall be sufficiently fine and numerous to permit several of the threads to enter each of the spaces between the teeth so that the threads will tend to jam in the spaces and thus thoroughly scrape out all the matter accumulated between the teeth.

It is obvious that changes in detail construction of the frame and handle may be made without departing from the scope of the claim, and I therefore do not desire to be limited to the detail construction shown.

Having thus fully described my invention, what I claim as new and desire to secure by Letters Patent, is—

A comb cleaning device consisting of a handle, a yielding frame provided with a pair of depending arms at each end, the arms at one end being connected by a stationary cross bar and the arms at the other end being each provided with an elongated eye, a flat cross bar having its ends in separable engagement with said elongated eyes, and the webbing connecting said cross bars and consisting of numerous flexible threads, said threads being looped around the stationary cross bar and having their free ends wound about the removable cross bar, the resilience of the frame serving to hold said threads taut.

In testimony whereof I hereunto affix my signature in the presence of two witnesses this 12th day of October 1910.

FRANCOIS X. COTE.

Witnesses:
LOUIS B. LAUSIER,
FRED. H. SMALL.